Patented June 3, 1947

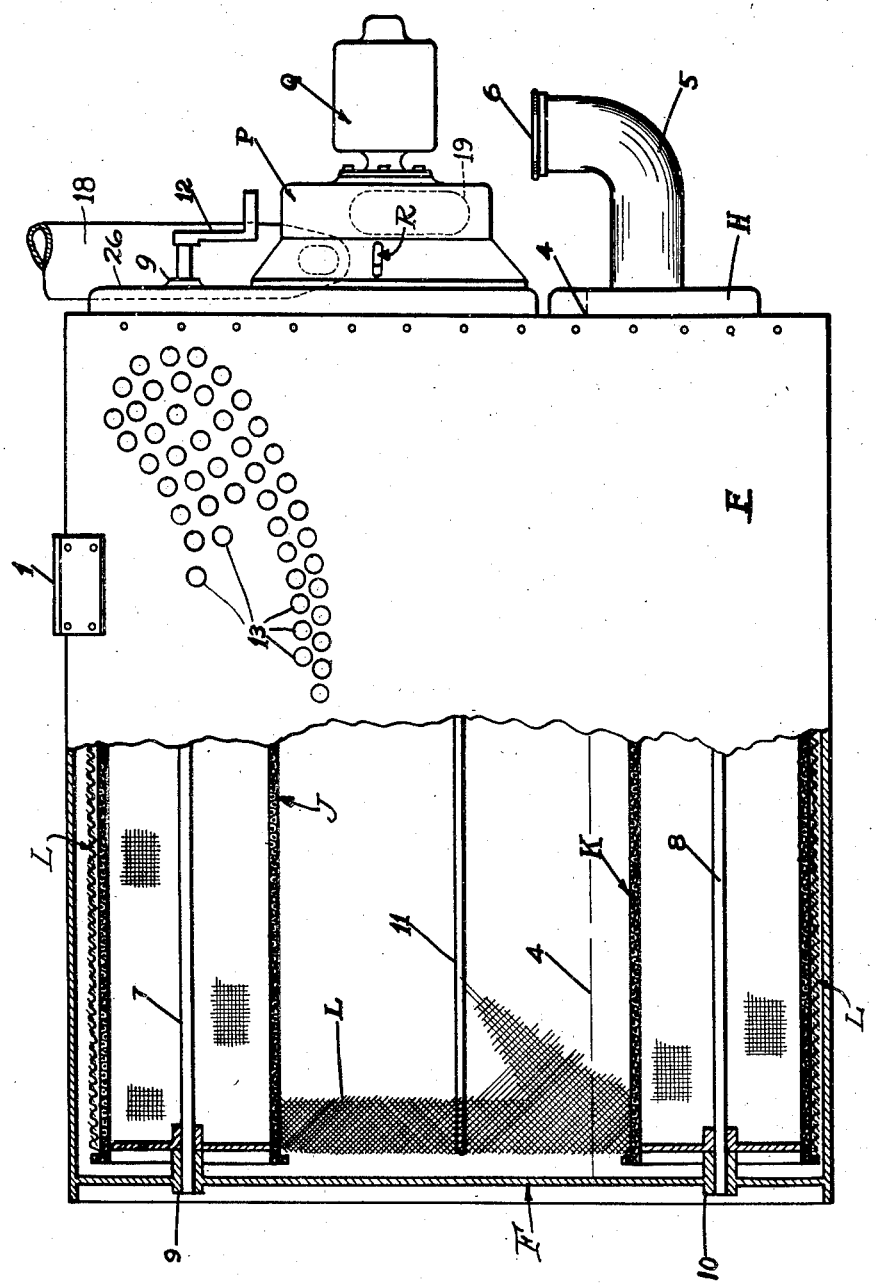

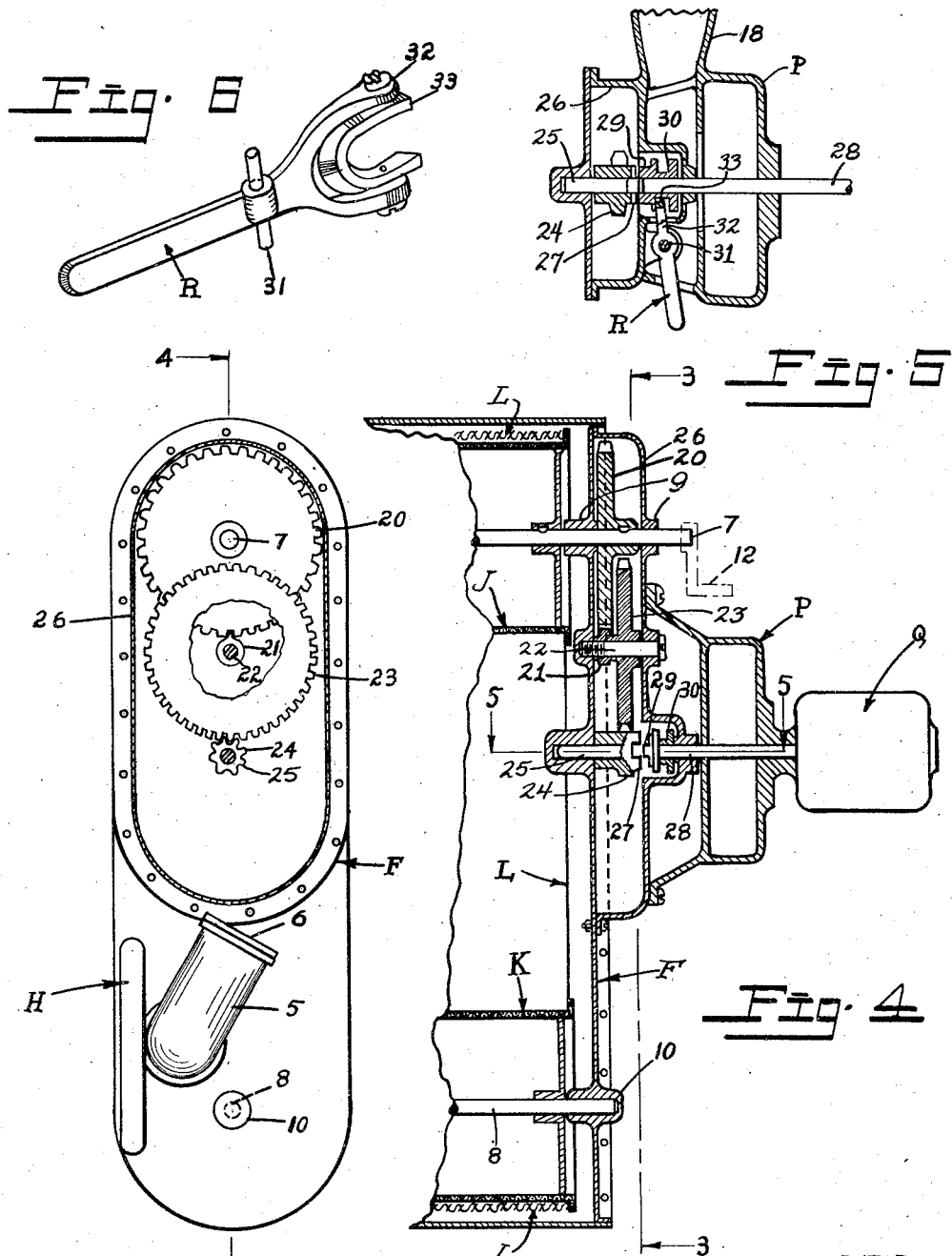

2,421,557

UNITED STATES PATENT OFFICE 2,421,557

HYDRO-VAPOR AIR CONDITIONER

George Haniquet, Glendale, Calif.

Application June 2, 1945, Serial No. 597,301

4 Claims. (Cl. 261—80)

An object of my invention is to provide a hydro-vapor air conditioner which is designed especially to keep vehicle interiors cool for the greater comfort of the occupants. The device has novel means for causing the air entering the cowl vent to have water vapor added thereto so that this air will be cooled by the evaporation of the water vapor and thus will cool the interior of an automobile or other vehicle. I provide manual means for adding water vapor to the air as it enters the vehicle.

A further object of my invention is to provide a device of the type described in which means is provided for forcing air into the car interior should the normal flow of air into the cowl vent not be sufficient. The forced ventilation means can be used when the car is standing still.

A modified form of the device employs novel means for continuously adding water vapor to the air as it enters the car so long as the device operates. The means used may be disconnected from the source of power by the mere swinging of a lever and when this is done, the manual means may again be resorted to for adding water vapor to the air as desired.

The device is simple in construction and may be installed in an out-of-the-way position in the interior of the vehicle. Only slight alterations need be made in the vehicle to place the device in position.

Other objects and advantages will appear in the following specification, and the novel features of the device will be particularly pointed out in the appended claims.

My invention is illustrated in the accompanying drawings forming a part of this application, in which:

Figure 2 is a front elevation of the device, portions being shown in section for clarity;

Figure 3 shows a modified form of the device and is a vertical section taken along the line 3—3 of Figure 4;

Figure 4 is a vertical transverse section through one end of Figure 3, and is taken along the line 4—4 of Figure 3;

Figure 5 is a horizontal section through a portion of the device and is taken along the line 5—5 of Figure 4, and Figure 6 is a perspective view of the clutch-shifting lever.

Figure 1:
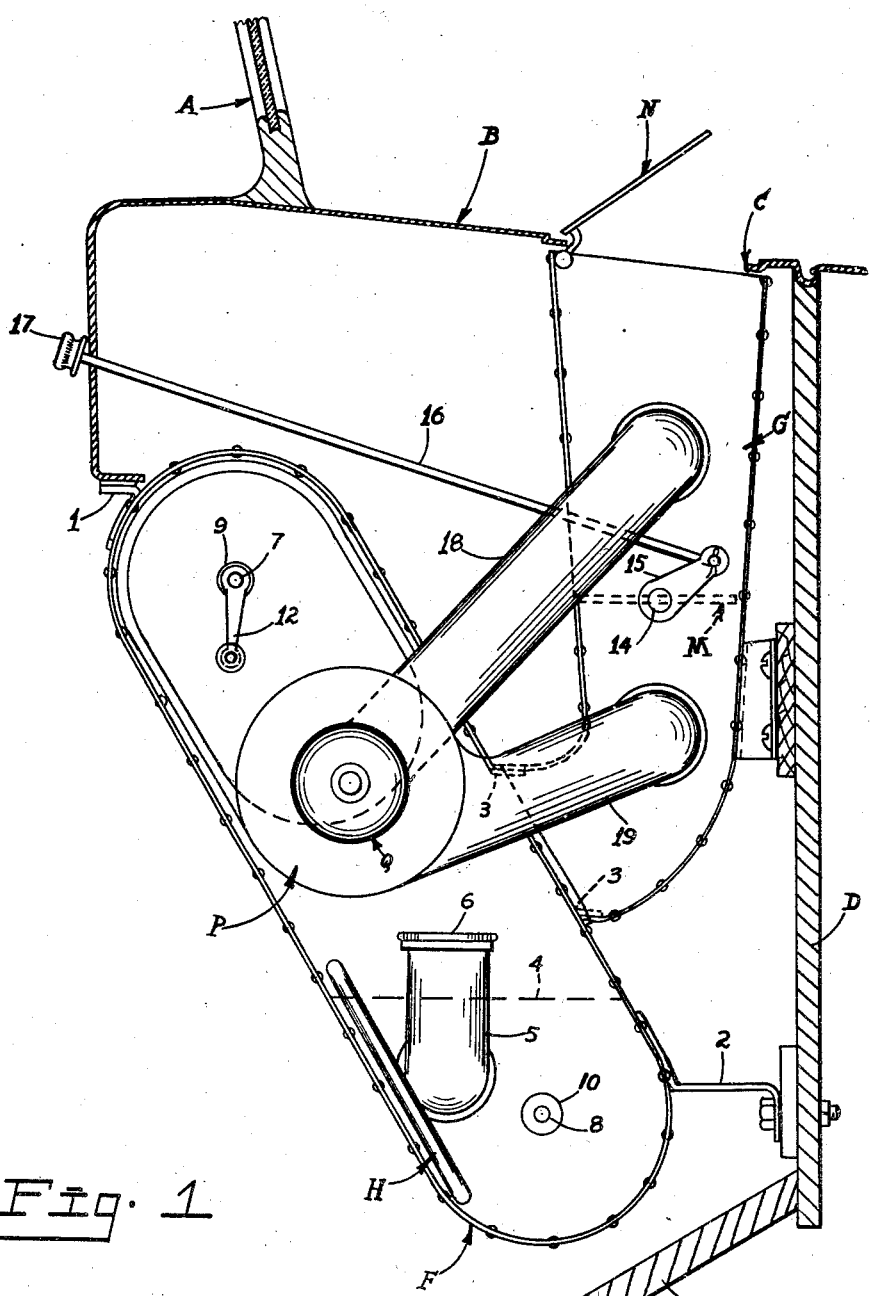
Figure 1 is a side elevation of the device shown operatively applied in a vehicle body.

While I have shown only the preferred forms of my invention, it should be understood that various changes or modifications may be made within the scope of the appended claims without departing from the spirit and scope of the invention.

In carrying out my invention, I make use of a motor vehicle and this vehicle has the usual windshield A, cowl B, vent C, dashboard D, and toe board E. These parts are all of standard construction and form no part of my invention except in so far as they cooperate with the parts now to be described.

My device comprises a casing F, oval-shaped in construction and which is secured to the vehicle by brackets 1 and 2 or other suitable fastening means. The rounded top of the casing is inclined forwardly while the rounded bottom is placed near the dashboard D so that the device will not interfere with the feet of the occupants of the car.

A vent duct G leads from the vent opening C to an opening 3 in the wall of the casing F. The opening 3 is disposed above the lower casing portion so that it is placed well above a water line indicated at 4 in Figure 1. Both Figures 1 and 2 show an L-shaped water inlet pipe 5 communicating with the casing near the lower end thereof and water may be poured into the casing bottom through the pipe until the level reaches the line shown. A water gage H is placed near the bottom of the casing and communicates with the casing interior at both ends of the gage so as to indicate the level of the water within the casing. A cover 6 is removably placed over the pipe 5 after a sufficient quantity of water has been poured into the casing bottom.

In Figure 2, I show the casing F provided with an upper horizontal shaft 7 and also a lower horizontal shaft 8. These shafts are mounted in bearings 9 and 10 carried by the ends of the casing and each shaft rotatably supports a vented roller. The shaft 7 carries a vented driven roller J while the shaft 8 carries a vented idler roller K. Each roller is covered with a screening material so that air and water can pass therethrough. An endless belt L made of water absorbing fabric is passed around both rollers and when the rollers are rotated, the belt has one portion moved down into the water and the other portion moved up out of the water for a purpose presently to be described. The belt is preferably provided with spreaders 11 for holding the belt in proper shape.

Figure 2 shows a crank handle 12 connected to the shaft 7 so that the shaft may be manually rotated for causing the rollers J and K to move the fabric belt in the manner already described. It will be noted from Figure 2 that the front wall of the casing F has a plurality of openings 13 therein disposed near the casing top through which air is forced from the casing after the air enters the casing through the opening 3.

In Figure 1 I show a butterfly valve M placed in the vent duct C and pivoted at 14. An arm 15 is connected to the valve M and can swing the valve from the closed position shown into a vertical position when the rod 16, connected to the arm, is pulled outwardly by means of a knob 17. The valve M is caused to remain in a vertical position when there is sufficient air entering the vent duct through the cowl opening C while the vehicle travels along the road. A cowl cover N is opened to permit air to enter the opening C.

A wet portion of the fabric belt is brought into a position over the air outlet openings 13 by a turning of the crank 12 and this will cause the air that passes through the vent duct and into the casing F, to pass through the moistened portion of the fabric and carry moistened air or air ladened with water vapor into the interior of the car. The water vapor in the air will evaporate and cool the air. As quickly as the wet portion of the fabric becomes dry, the crank 12 is again manually turned to bring another wet portion of the fabric into proper position. The dry portion is moved back into the body of water for absorbing water. Either the driver or the person occupying the seat next to him may operate the crank 12 from time to time as desired.

In case the air flowing into the vent duct is not sufficient to keep the car cool, I provide a blower attachment which can be used for forcing the air through the device. I show the blower at P in Figure 1 and this blower has an inlet pipe 18 connecting with the portion of the vent duct disposed above the valve M and leading to the center of the blower. An outlet pipe 19 leads from the periphery of the blower to the portion of the vent duct disposed below the closed valve M. A motor Q is directly connected to the blower and may be connected to the source of current in the automobile by a switch not shown. If desired the switch may be closed by the swinging of the valve M into closed position.

When the motor Q is connected to the source of current, it will cause the blower to suck in air from the vent duct portion disposed above the closed valve through the pipe 18 and to force this air into the vent duct portion disposed below the closed valve. The air flowing through the casing will pick up moisture from the fabric and will then pass on into the interior of the vehicle body through the opening 13. The water vapor evaporates and in this way the temperature within the vehicle body is kept cooler than the outside temperature.

It is possible to cause the motor Q to operate the rollers J and K that move the belt through the water so that the belt will be moved continuously through the water to present a continuously wet portion over the openings 13 at all times. I show such an arrangement in a modified form of the device illustrated in Figures 3 to 6, inclusive to carry out this inventive concept. The shaft 7 carries a large gear 20, see Figure 3, and this gear meshes with a single toothed gear 21 mounted on a stub shaft 22. A large gear 23 is mounted on the same stub shaft 22 and meshes with a small gear or pinion 24 which is mounted on a second stub shaft 25. In Figure 3 the gear housing 26 is shown in section.

Referring to Figure 4 it will be noted that the pinion 24 has an integral clutch member 27 formed in its face. The motor Q has a motor shaft 28 that not only actuates the blower P, but has a clutch member 29 slidably keyed thereon, the clutch member having an integral collar 30. Since the collar and clutch member are keyed to the shaft 28, they rotate therewith.

In Figures 5 and 6 I show a gear shifting lever R pivotally mounted at 31. The perspective view of the lever R shown in Figure 6, discloses the lever being bifurcated at 32 and having a U-shaped yoke 33 pivotally mounted therein. The yoke rotatably receives the collar 30. The lever R may be swung for disconnecting the clutch member 29 from the clutch member 27 whereupon the belt L will not be moved through the water by the motor. When the lever is swung to connect the clutch members together, the motor will operate the gear train and impart a rotating movement to the roller J, which in turn will continuously move the belt through the body of water. Figure 5 shows the air inlet pipe 18 connecting with the center of the blower P.

The operation of this form of the device is the same as that in the form shown in Figures 1 and 2 except that the motor Q performs two functions in that it forces air through the device and also operates the belt when the motor is connected to the gear train. The temperature of the air passing through the openings 13 can be controlled within certain limits by the amount of water vapor picked up by the air as it passes through the belt. The amount of water vapor picked up by the air can be controlled by manipulating the lever R or turning the crank 12.

I claim:

1. A hydro-vapor air conditioner comprising a casing adapted to hold a fluid in the lower portion thereof, an endless fabric, means for causing the fabric to follow the contour of the inner surface of the casing so that it will extend into the fluid, said casing having an air inlet and air outlets, the air outlets being disposed adjacent to a portion of the fabric, and means for moving the fabric so that a wet portion saturated by the fluid in the casing can be moved opposite the air outlets so that the air passing through the outlets will pick up moisture from the fluid impregnated fabric, this air being cooled by the evaporation of the moisture picked up, an air conduit leading from a cowl inlet of an automobile and extending to the air inlet of the casing, said cowl inlet being provided with a cover which when opened will direct air into the conduit, a butterfly-valve mounted in the air conduit and manually swingable from open to closed position, a blower, an air passage leading from the air conduit at a point between the valve and the cowl inlet to the blower entrance, and a second air passage leading from the blower outlet to the air conduit and communicating with the air conduit at a point between the valve and the casing air inlet, whereby a closing of the valve and a starting of the blower will draw in air through the first air passage and force it out through the second air passage and through the casing.

2. The combination with an automobile having an air-conveying conduit communicating with a cowl vent, and a cover for the vent, of a casing adapted to hold a fluid in its lower portion and having an air inlet communicating with the conduit, said casing having air outlets opening into the automobile interior, and means for moving a fabric through the fluid and into a position where the air flowing through the casing from the conduit must pass through the moistened portion of the fabric before passing out through the outlet openings, whereby the air will pick up moisture from the fluid carried by the fabric and will be cooled by the evaporation of this fluid, a butterfly-valve mounted in the air conduit and manually swingable from open to closed position, a blower, an air passage leading from the air conduit at a point between the valve and the cowl inlet to the blower entrance, and a second air passage leading from the blower outlet to the air conduit and communicating with the air conduit at a point between the valve and the casing air inlet, whereby a closing of the valve and a starting of the blower will draw in air through the first air passage and force it out through the second air passage and through the casing.

3. A hydro-vapor air conditioner comprising a casing adapted to hold a fluid in the lower portion thereof, screen rollers mounted in the top and bottom of the casing, an endless fabric mounted on the rollers, manual means for rotating one of the rollers for causing the fabric to pass through the fluid and be dampened, said casing having an air inet opening and air outlet openings so arranged with respect to the fabric that the air must pass through the moistened fabric portion in passing through the casing and through the outlet openings, an air blower for forcing air into the inlet and through the outlets, a motor for the blower, and means for operatively connecting the manual roller rotating means to the blower so that the motor will continuously move the fabric through the fluid.

4. A hydro-vapor air conditioner comprising a casing adapted to hold a fluid in the lower portion thereof, an endless fabric, means for causing the fabric to follow the contour of the inner surface of the casing so that it will extend into the fluid, said casing having an air inlet in one upwardly extending wall and air outlets in a second upwardly extending wall which is spaced from the first wall, the air inlet being disposed adjacent to one fabric portion and the outlets being disposed adjacent to another portion of the fabric, and means for moving the fabric so that a wet portion saturated by the fluid in the casing can be moved opposite the air inlet and outlets so that the air passing through the inlet and outlets will pick up moisture from two portions of the fluid impregnated fabric, this air being cooled by the evaporation of the moisture picked up.

GEORGE HANIQUET.

REFERENCES CITED

The following references are of record in the file of this patent:

UNITED STATES PATENTS

| Number | Name | Date |
| --- | --- | --- |
| 2,104,119 | Forbush | Jan. 4, 1938 |
| 2,074,265 | Kirby | Mar. 16, 1937 |
| 1,118,200 | Haynes | Nov. 24, 1914 |
| 2,364,249 | Steele | Dec. 5, 1944 |